United States Patent
Agamy et al.

(10) Patent No.: US 8,829,715 B2
(45) Date of Patent: Sep. 9, 2014

(54) SWITCHING COORDINATION OF DISTRIBUTED DC-DC CONVERTERS FOR HIGHLY EFFICIENT PHOTOVOLTAIC POWER PLANTS

(75) Inventors: Mohammed Agamy, Niskayuna, NY (US); Ahmed Elasser, Latham, NY (US); Juan Antonio Sabate, Ganesvoort, NY (US); Anthony William Galbraith, Wirtz, VA (US); Maja Harfman Todorovic, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 749 days.

(21) Appl. No.: 13/097,196

(22) Filed: Apr. 29, 2011

(65) Prior Publication Data

US 2012/0274139 A1    Nov. 1, 2012

(51) Int. Cl.
  *H02J 1/12*   (2006.01)
  *H02M 3/00*   (2006.01)
  *H02J 3/38*   (2006.01)
  *H02M 3/158*  (2006.01)
  *H02M 1/00*   (2006.01)

(52) U.S. Cl.
  CPC ........ *H02J 3/385* (2013.01); *H02M 2001/0067* (2013.01); *Y02B 70/16* (2013.01); *H02M 3/1584* (2013.01); *Y02E 10/58* (2013.01); *H02M 2001/0032* (2013.01)
  USPC .......................................................... 307/71

(58) Field of Classification Search
  CPC .................. H02J 1/00; H02J 1/10; H02J 1/12
  USPC .......................................................... 307/71
  See application file for complete search history.

(56) References Cited

U.S. PATENT DOCUMENTS

| 7,339,287 | B2 | 3/2008 | Jepsen et al. |
| 7,719,140 | B2 | 5/2010 | Ledenev et al. |
| 7,778,045 | B2 | 8/2010 | Alexander |
| 7,787,270 | B2 * | 8/2010 | NadimpalliRaju et al. ..... 363/68 |

(Continued)

FOREIGN PATENT DOCUMENTS

| EP | 2337184 A2 | 6/2011 |
| JP | 2001268800 A | 9/2001 |

(Continued)

OTHER PUBLICATIONS

Search Report and Written Opinion from corresponding EP Application No. 12157063.4-1804 dated Apr. 19, 2013.

(Continued)

*Primary Examiner* — Hal Kaplan
(74) *Attorney, Agent, or Firm* — Paul J. DiConza

(57) ABSTRACT

A distributed photovoltaic (PV) power plant includes a plurality of distributed dc-dc converters. The dc-dc converters are configured to switch in coordination with one another such that at least one dc-dc converter transfers power to a common dc-bus based upon the total system power available from one or more corresponding strings of PV modules. Due to the coordinated switching of the dc-dc converters, each dc-dc converter transferring power to the common dc-bus continues to operate within its optimal efficiency range as well as to optimize the maximum power point tracking in order to increase the energy yield of the PV power plant.

23 Claims, 11 Drawing Sheets

(56) References Cited

U.S. PATENT DOCUMENTS

| | | | |
|---|---|---|---|
| 7,843,085 | B2 | 11/2010 | Ledenev et al. |
| 2011/0031816 | A1* | 2/2011 | Buthker et al. ............ 307/82 |
| 2011/0144822 | A1* | 6/2011 | Choi ............................ 700/297 |

FOREIGN PATENT DOCUMENTS

| | | |
|---|---|---|
| JP | 2007133765 A | 5/2007 |
| JP | 2010193693 A | 9/2010 |
| WO | 2010120315 A1 | 10/2010 |

OTHER PUBLICATIONS

Liccardo et al., "Interleaved dc-dc Converters for Photovoltaic Modules", Clean Electrical Power, 2007. ICCEP'07. International Conference on, IEEE, PI, pp. 201-207, May 1, 2007.

Sefa et al., "Experimental study of interleaved MPPT converter for PV systems", IECON 2009—35TH Annual Conference of IEEE Industrial Electronics (IECON 2009)—Nov. 3-5, 2009—Porto, Portugal, IEEE, Piscataway, NJ, USA, pp. 456-461, Nov. 3, 2009.

Jun-Yin et al., "Research on photovoltaic grid-connected inverter based on soft-switching interleaved flyback converter", Industrial Electronics and Applications (ICIEA), 2010 the 5TH IEEE Conference on, IEEE, Piscataway, NJ, USA, pp. 1209-1214, Jun. 15, 2010.

Sefa et al., "Multifunctional interleaved boost converter for PV systems", Industrial Electronics (ISIE), 2010 IEEE International Symposium on, IEEE, Piscataway, NJ, USA, pp. 951-956, Jul. 4, 2010.

Abdel-Rahim et al., "Buck-boost interleaved inverter for grid connected Photovoltaic system", Power and Energy (PECON), 2010 IEEE International Conference on, IEEE, Piscataway, NJ, USA, pp. 63-68, Nov. 29, 2010.

Search Report and Written Opinion from corresponding EP Application No. 12157063.4-1804 dated Sep. 12, 2013.

Araujo et al., "Analysis on the potential of Silicon Carbide MOSFETs and other innovative semiconductor technologies in the photovoltaic branch", 13TH European Conference on Power Electronics and Applications, 2009: EPE '09 ; Sep. 8-10, 2009, Barcelona, Spain, IEEE, Piscataway, NJ, USA, pp. 1-10, Sep. 8, 2009.

\* cited by examiner

US 8,829,715 B2

SWITCHING COORDINATION OF DISTRIBUTED DC-DC CONVERTERS FOR HIGHLY EFFICIENT PHOTOVOLTAIC POWER PLANTS

STATEMENT REGARDING FEDERALLY SPONSORED RESEARCH & DEVELOPMENT

This invention was made with U.S. Department of Energy support under contract number DE-EE0000572. The Government has certain rights in the invention.

BACKGROUND

This invention relates generally to photovoltaic (PV) power plants, and more particularly, to a system and method for coordinating the switching of distributed dc-dc converters associated with PV modules to yield highly efficient photovoltaic power plants.

PV plant architectures take several forms starting from the conventional central inverter system to a fully distributed system as shown in FIGS. 1-4, all of which can be considered to have multiple dc-dc power converters. FIG. 1, for example, illustrates a PV plant architecture 10 that employs a two-stage central inverter 12. FIG. 2 illustrates a PV plant architecture 20 that employs a string combiner distribution of dc-dc converters 22. FIG. 3 illustrates a PV plant architecture 30 that employs a string distribution of dc-dc converters 32. FIG. 4 illustrates a PV plant architecture 40 that employs a module level distribution of dc-dc converters 42.

Power converters are designed to have high efficiency over a range of its operating power. Maintaining power converter operation within this power range will result in significant energy savings. PV modules are not at their rated power for most of their operating time; therefore the dc-dc converter stage(s) associated with them are always operated at partial load and in many cases at light load. Well-designed power converters have a high efficiency that is relatively constant for a wide load range. Converter losses however, constitute a larger percentage of the input power as this power level becomes smaller and consequently, light load efficiency of these converters fall sharply.

Distributed PV plant architectures such as described above have benefits in increasing the energy yield of the plant. Distributed PV plant architectures provide, for example, more operational flexibility due to the availability of multiple dc-dc or dc-ac converters that can be controlled to operate simultaneously and share the generated power or switched in and out when needed. Although distributed PV plant architectures provide increased energy yield and operational flexibility, they still suffer from reduced power conversion efficiency at partial and/or light loading in PV power plants.

In view of the foregoing, there is a need for a method of operating distributed dc-dc converters associated with PV modules to yield highly efficient photovoltaic power plants that mitigate the effects of losses due to, for example, shading, soiling, mismatch, transient event, and the like.

BRIEF DESCRIPTION

According to one embodiment, a string level maximum power point distributed photovoltaic (PV) power plant comprises:
one or more dc-dc converters; and
at least one string of PV modules, wherein each dc-dc converter receives power from at least one corresponding string of PV modules, and further wherein at least one dc-dc converter is configured to transfer power to a common dc-bus based upon the total system power available from each of its corresponding strings of PV modules such that each dc-dc converter transferring power to the common dc-bus continues to operate within its optimal efficiency range to increase the energy yield of the PV power plant.

According to another embodiment, a method of operating a string level maximum power point distributed photovoltaic (PV) power plant comprises:
providing one or more dc-dc converters, each dc-dc converter receiving power from at least one string of corresponding PV modules; and
transferring power to a common dc-bus from at least one of the one or more dc-dc converters such that the power transferred from each dc-dc converter contributing power to the common dc-bus is based upon the total system power available from each of its corresponding strings of PV modules, and further such that each dc-dc converter transferring power to the common dc-bus continues to operate within its optimal efficiency range to increase the energy yield of the PV power plant.

According to yet another embodiment, a string level maximum power point distributed photovoltaic (PV) power plant comprises a plurality of distributed dc-dc converters configured to switch in coordination with one another such that at least one dc-dc converter transfers power to a common dc-bus based upon the total system power available from one or more corresponding strings of PV modules, and further such that each dc-dc converter transferring power to the common dc-bus continues to operate within its optimal efficiency range to increase the energy yield of the PV power plant.

DRAWINGS

These and other features, aspects, and advantages of the present invention will become better understood when the following detailed description is read with reference to the accompanying drawing, wherein.

While the above-identified drawing figures set forth particular embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION

The embodiments described herein provide increased power conversion efficiency of a solar plant by selectively operating a number of dc-dc converters that is sufficient to handle the power generated by the PV modules while operating in their highest efficiency operating region since each converter will see a higher input power to process than when all converters are operated all the time. Consequently, the individual operational converter efficiency will remain higher for a wider range of total input power.

Figure 2:
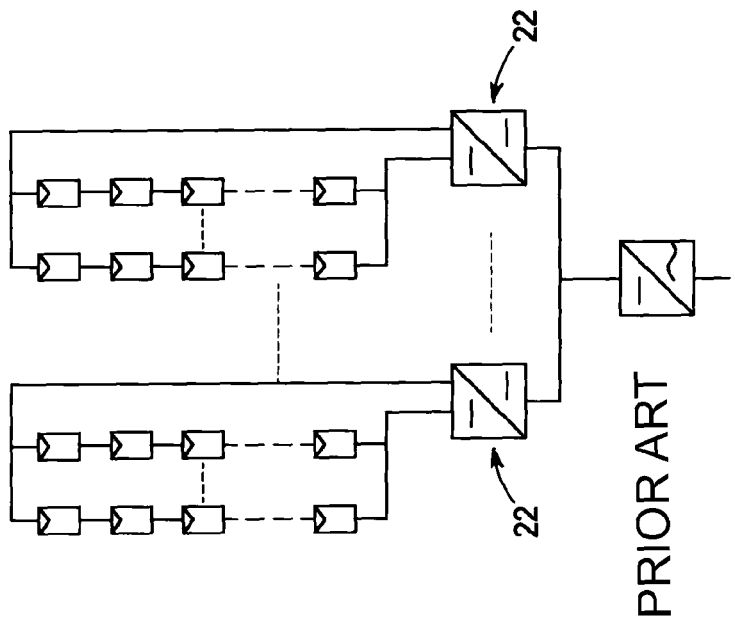
FIG. 2 illustrates a PV plant architecture that employs a string combiner distribution of dc-dc converters.
Figure 1:
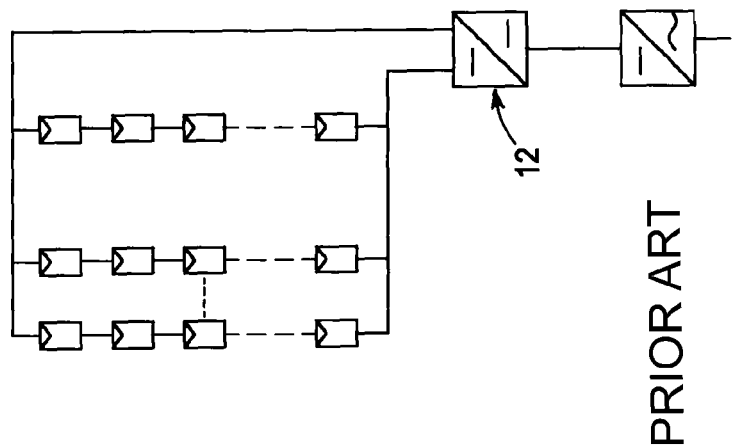
FIG. 1 illustrates a PV plant architecture that employs a two-stage central inverter.
Figure 4:
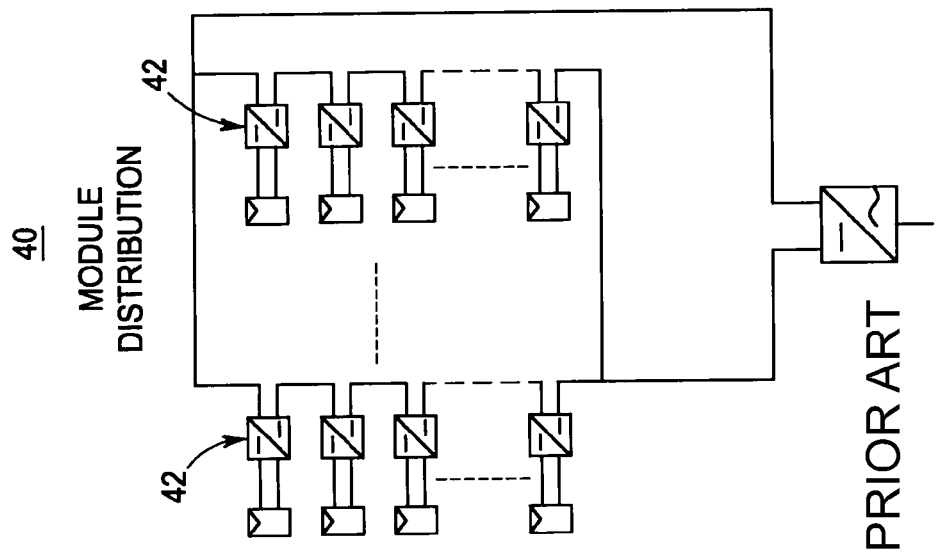
FIG. 4 illustrates a PV plant architecture that employs a module level distribution of dc-dc converters.
Figure 3:
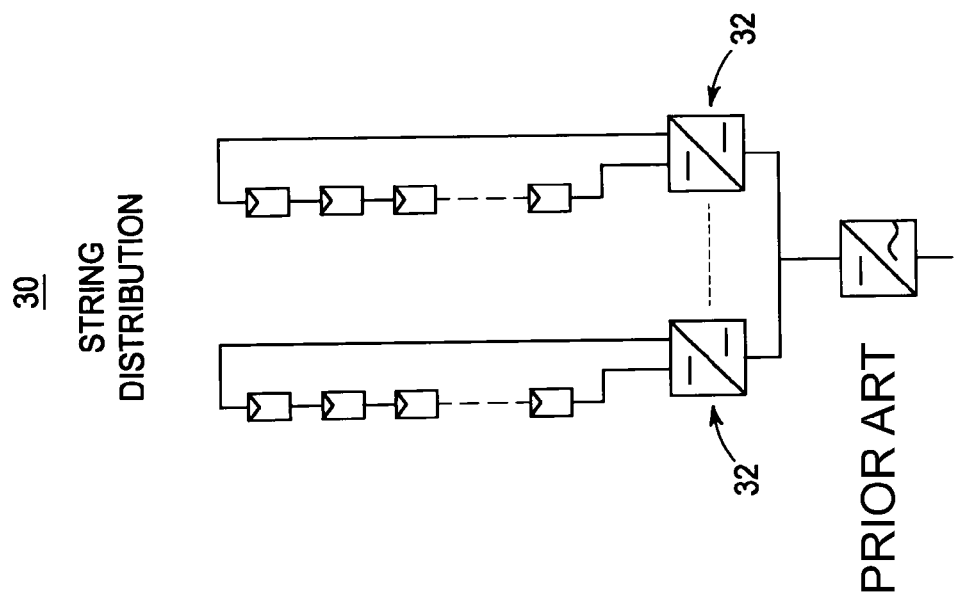
FIG. 3 illustrates a PV plant architecture that employs a string distribution of dc-dc converters.

PV plant architectures take several forms starting from the conventional central inverter system to a fully distributed system such as described herein with reference to FIGS. 1-4. All of the PV plant architectures depicted in FIGS. 2-4 can be considered to have multiple dc-dc converters. Selective operation of converters becomes inapplicable in the case of module level distribution such as illustrated in FIG. 4 because it may result in the total shutdown of an associated module, which contradicts the desired result of maximizing the plant energy yield. Selective operation of converters is otherwise applicable for fully distributed PV plant architectures such as illustrated in FIGS. 2-3.

Figure 5:
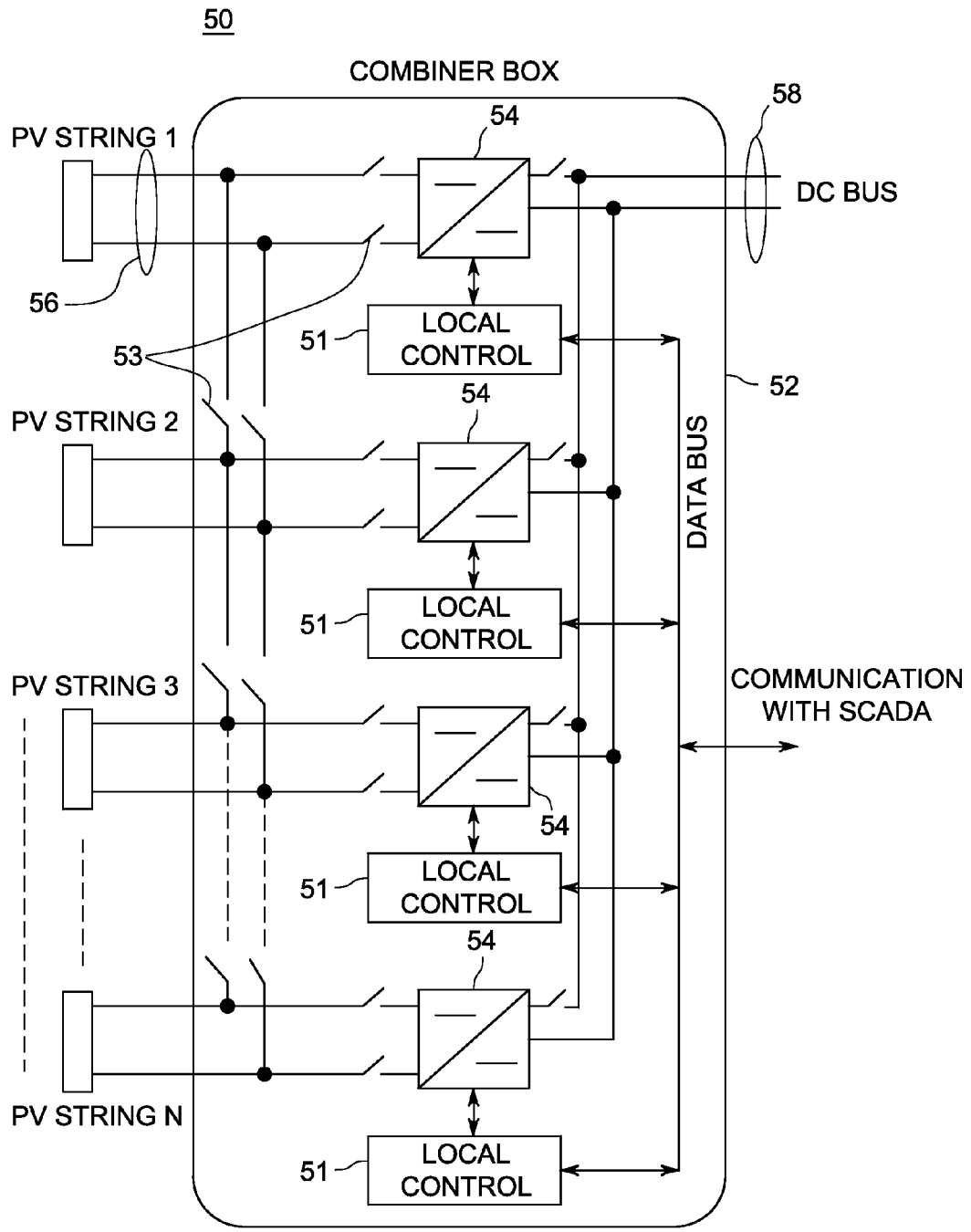
FIG. 5 illustrates a distributed PV architecture with a single dc-dc converter per string operating with selective converter switching according to one embodiment.

Dc-dc converters connected to PV strings can be stacked in a string combiner box 52 located at a central location with respect to the strings such as depicted in FIG. 5 that illustrates a distributed PV architecture 50 with a single dc-dc converter 54 per string operating with selective converter switching according to one embodiment. The power flow is controlled by means of sets of switches 53, which can either be semiconductor devices or mechanical switches. The terminals 56 of each string are led to the combiner box 52. Based on the amount of power fed by the strings, a sufficient number of dc-dc converters 54 are operated to transfer power to a corresponding dc-bus 58, i.e. for partial loading, some converters 54 are switched out and multiple strings are connected in parallel to feed other converters 54 such as depicted in FIG. 5.

According to one embodiment, local controllers 51 operate to ensure proper current sharing between converters 54 when several strings are connected to each operational converter 54. The efficiency of a system of string level converters processing partial power with equal current sharing is significantly improved when coordinated switching of the appropriate number of converters 54 is used as compared to independently operating strings of dc-dc converters 54. Further, coordinated switching provides an improvement at light loads when compared to a central high power dc-dc converter, which still maintains a slightly higher efficiency at high load conditions.

Figure 6:
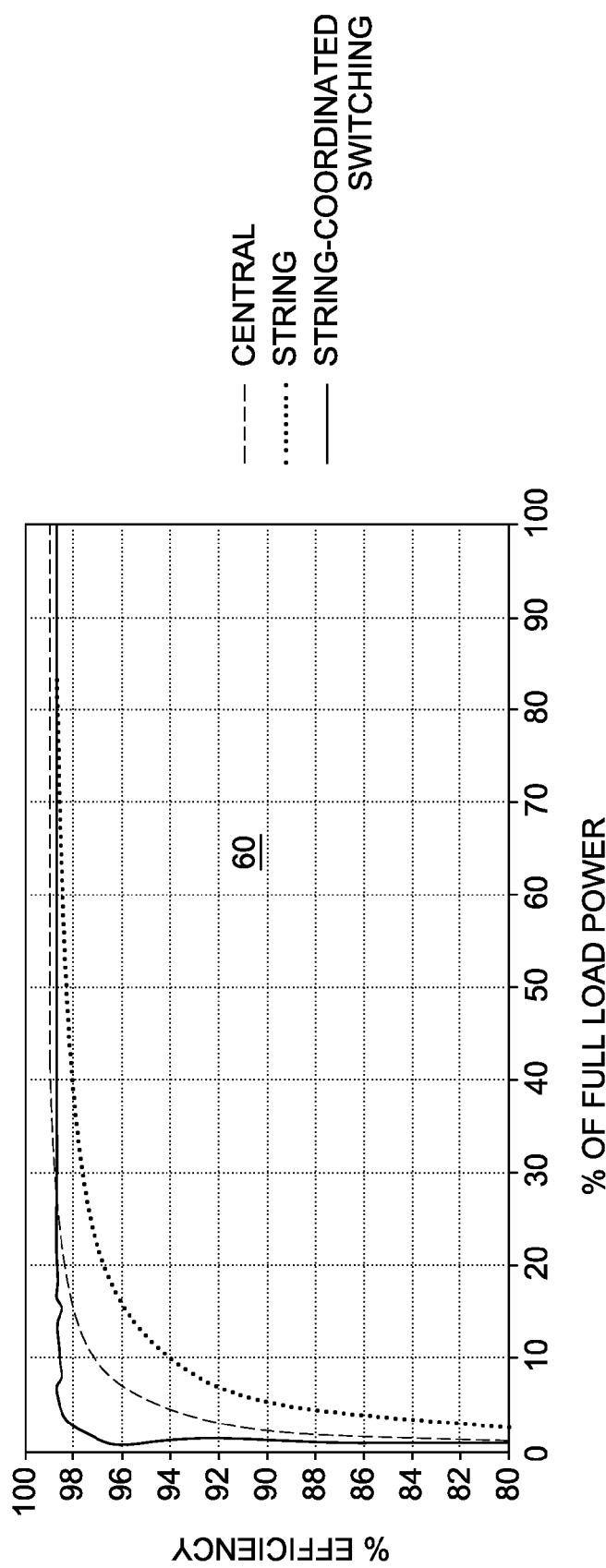
FIG. 6 is a graph illustrating an efficiency comparison between central, distributed dc-dc converters per string and distributed dc-dc converters per string with coordinated switching according to one embodiment.

FIG. 6 is a graph 60 illustrating an efficiency comparison between central, distributed dc-dc converters per string and distributed dc-dc converters per string with coordinated switching according to one embodiment that comprises a set of 14 strings, each rated at 3 kWp and connected to a string combiner, thus providing a total of 42 kWp. The results illustrate that string converters with coordinated switching start showing a system efficiency improvement when the PV panels produce less than 50% of their rated power; and this improvement increases significantly as the power is reduced. Further, selectively switched dc-dc converters can be seen to surpass a central dc-dc converter processing this power below about 25% of generation capacity.

The input power flow to the dc-dc converters is controlled by a number of switches. These switches, which may be mechanical switches or semiconductor switches, can be within or external to the power converter. Converter switches in interleaved topologies such as in FIGS. 9 and 12 can also be coordinated in a way that controls power flow between the channels of the interleaved dc-dc converters. Control signals for these switches can be provided either through local controllers or a central control unit. In addition to the topologies in FIGS. 9 and 12, coordinated switching can be applied in a similar manner to any interleaved dc-dc converter topology with any number of channels.

Figure 7:
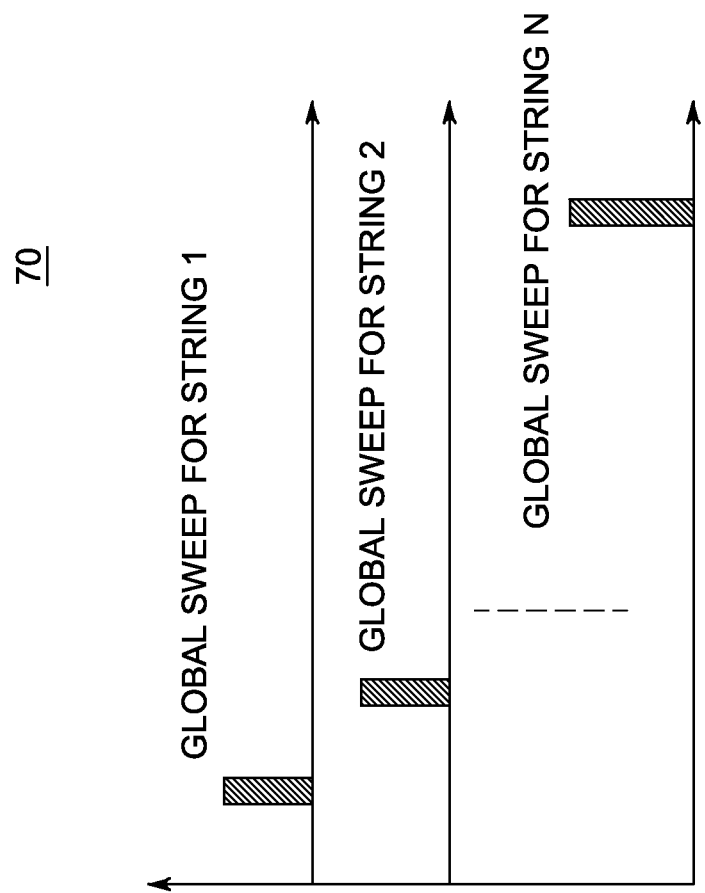
FIG. 7 is a timing diagram illustrating the sequencing of global MPP sweep for a plurality of different string converters according to one embodiment.

According to one embodiment, team operation of string converters according to the principles described herein advantageously allows coordination of a global maximum power point (MPPT) search. Performing a global MPPT search with a central dc-dc converter causes a significant power drop during the time period of the sweep. This can be transformed into several small power reductions if the MPPT search is performed on individual converters such that overall plant generation is not significantly affected for a plant architecture that employs team operation of string converters. According to one embodiment, a central controller can be used to implement a time shifted global MPPT sweep for all the converters being controlled by the central controller. FIG. 7 is a timing diagram 70 illustrating timing of a global MPPT sweep for a plurality of different string converters according to one embodiment.

Figure 8:
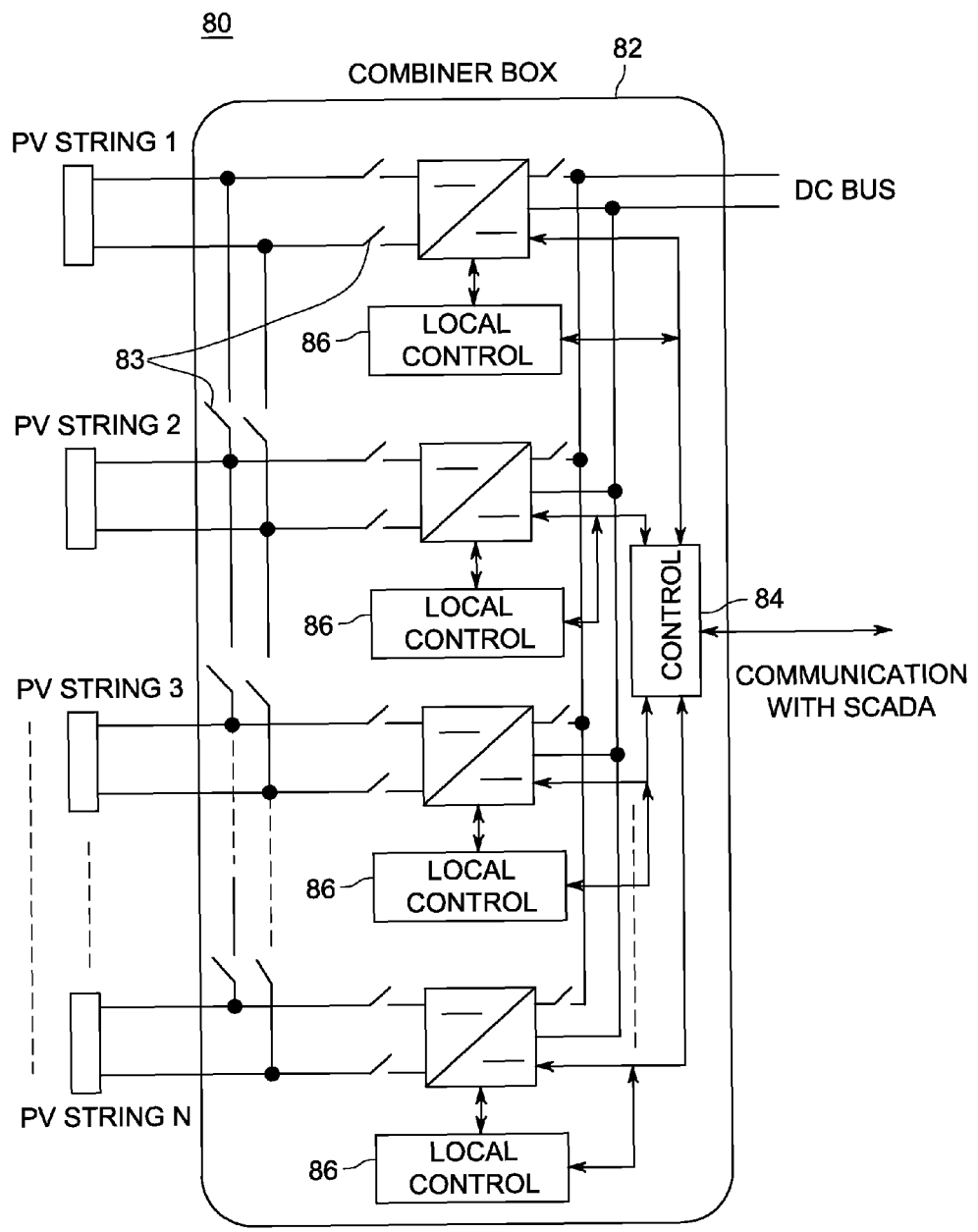
FIG. 8 illustrates a group of selectively switched string converters with a central controller per combiner box according to one embodiment.

FIG. 8 illustrates coordinated switching string converters with a central controller per combiner box 82 and power flow directing switches 83 according to one embodiment that is suitable for implementing a time shifted global MPPT sweep such as described herein with reference to FIG. 7. The desired central control can be implemented on a plant level such as illustrated in FIG. 5 according to one embodiment, or can be implemented with a controller 84 placed in each combiner box 82 communicating with local converter controllers 86 such as depicted in FIG. 8.

Figure 9:
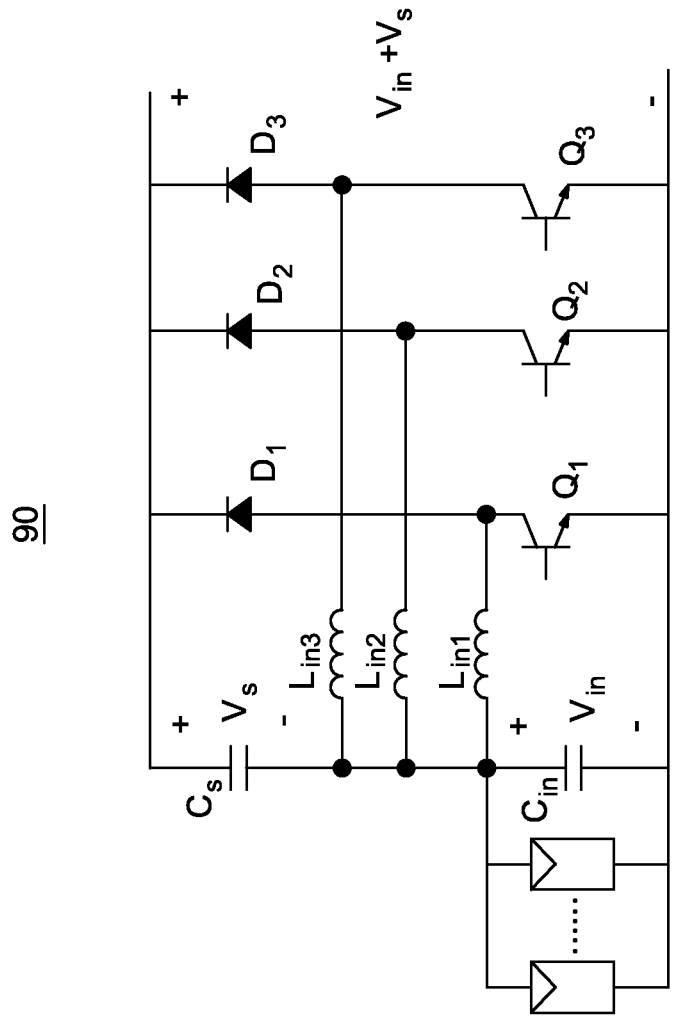
FIG. 9 illustrates an interleaved buck-boost string converter topology according to one embodiment.

FIG. 9 illustrates an interleaved buck-boost string dc-dc converter topology 90 that is suitable for use in a coordinated switching process according to one embodiment. The switching frequency and the number of operational channels together determine the delay between each channel switching pulses. The result of this operation is the desired higher partial load efficiency characteristic.

Figure 10:
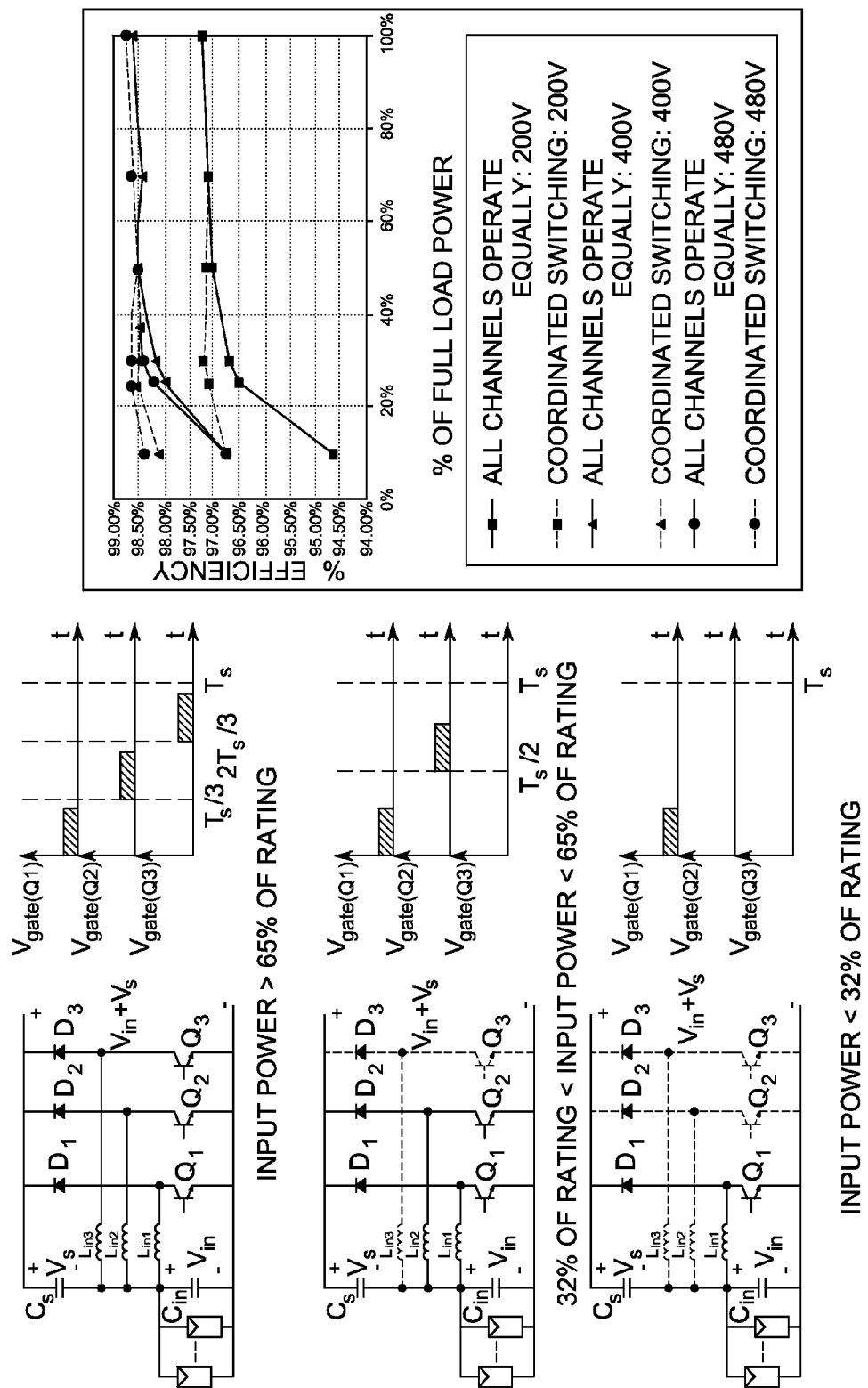
FIG. 10 illustrates the operation and efficiency of the interleaved buck-boost string converter depicted in FIG. 9 at different levels of input power according to one embodiment.

FIG. 10 illustrates the operational stages and resulting partial load efficiency characteristic of the interleaved buck-boost string converter 90 depicted in FIG. 9 at different levels of input power for a 5.25 kW converter split into three channels of 1.75 kW power rating.

Figure 11:
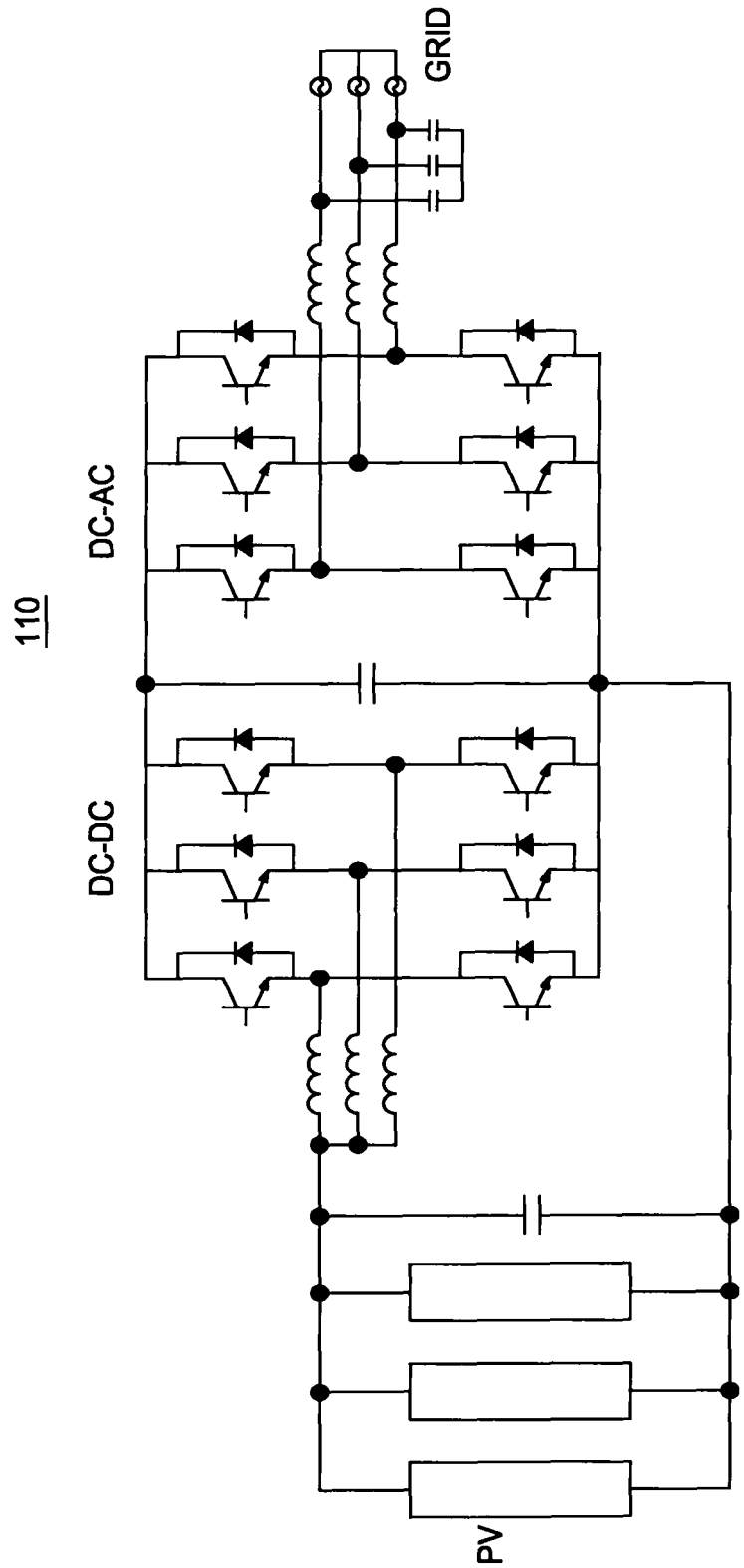
FIG. 11 illustrates a conventional two-stage central PV inverter topology.
Figure 12:
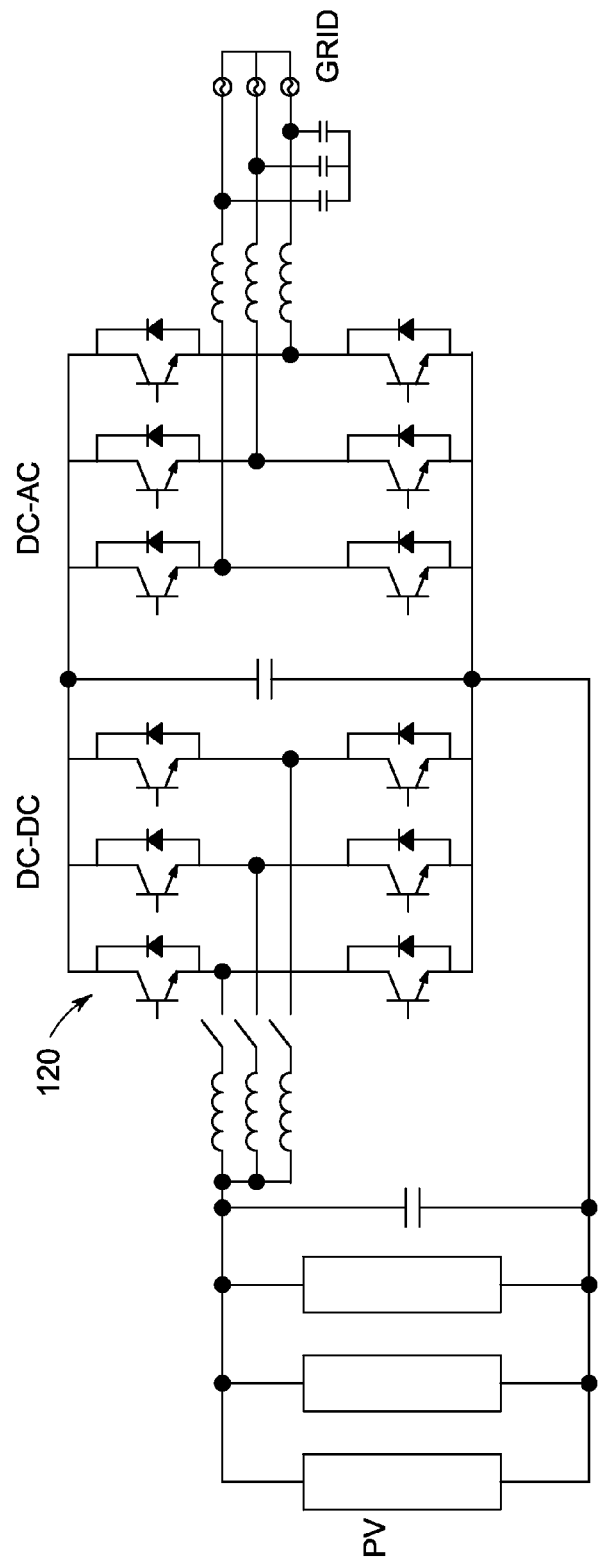
FIG. 12 illustrates coordinated switching of the dc-dc stage of the two-stage central PV inverter depicted in FIG. 11 according to one embodiment.

FIG. 11 illustrates a conventional two-stage central PV inverter topology 110. FIG. 12 illustrates team operation of the dc-dc stage of the two-stage central PV inverter depicted in FIG. 11 according to one embodiment. More specifically, the same switching coordination concepts and principles described herein before can be applied to the conventional two-stage central PV inverter topology 110 by systematically choosing how many legs of the input boost converter 120 are operated such that the overall converter efficiency is increased over a wide load range such as illustrated for one embodiment in FIG. 13.

Figure 13:
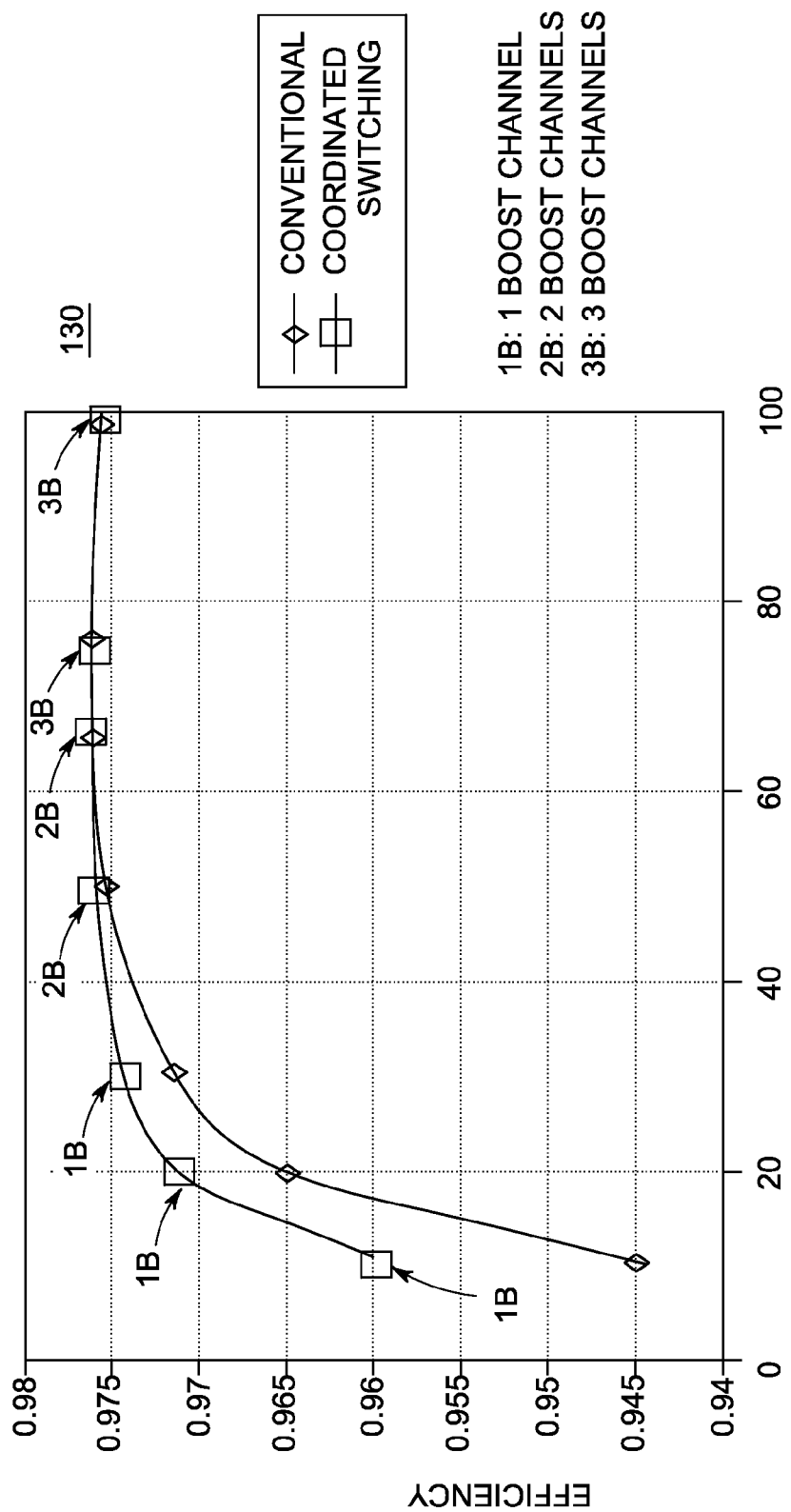
FIG. 13 is a graph illustrating efficiency curves for the two-stage central PV inverter with the dc-dc stage operated with coordinated switching depicted in FIG. 12 according to one embodiment.

FIG. 13 is a graph 130 illustrating efficiency curves of the dc-dc stage portion for the two-stage central PV inverter with the coordinated switching dc-dc stage 120 depicted in FIG. 12 according to one embodiment. Operation of the two-stage central PV inverter using one leg of the dc-dc stage 120, two legs of the dc-dc stage 120 and three legs of the dc-dc stage 120 are shown. The efficiency of the dc-dc stage 120 using switching coordination can be seen to exceed the efficiency of the dc-dc stage 120 using conventional operating techniques for input power below about 70% of the PV plant rated generation.

Coordinated switching of distributed dc-dc converters according to the principles described herein advantageously provides a high and constant overall efficiency curve for the dc conversion stage of the PV power plant.

Further, coordinated switching of distributed dc-dc converters as described herein advantageously allows for coordinated MPPT global searches in a manner such that they do not all coincide at the same time, thus preventing the occurrence of significant dips in the PV plant output power and allowing the individual global searches to be performed in a shorter time. As for the local MPPT search it can either be centralized or made independent for each of the dc-dc converters The concepts and principles described herein can be extended to two-stage solar inverters incorporating interleaved or paralleled input dc-dc stages. Further, for PV plants with multi-string dc-dc converters that feed into a central inverter as shown in FIG. 2, the dc-dc converters can also be operated with coordinated switching according to the amount of power being generated by the plant.

Other advantages provided by the coordinated switching concepts and principles described herein include without limitation, 1) improved monitoring and diagnostics capabilities for the distributed system; and 2) reduced operational time per dc-dc converter on average, thus increasing the overall lifetime of the converters across the plant since only a number of dc-dc converters sufficient to handle the generated power are required for operation of the plant. Rotating the sequence with which the dc-dc converters are activated and deactivated also helps provide a uniform increase in the lifetime of all converters throughout the PV power plant.

In summary explanation, switching coordination of distributed dc-dc converters for highly efficient photovoltaic (PV) power plants has been described herein. According to one embodiment, the PV power plant may comprise, without limitation, one or more dc-dc converters and at least one string of PV modules. Each dc-dc converter receives power from at least one corresponding string of PV modules. At least one dc-dc converter is configured to transfer power to a common dc-bus based upon the total system power available from each corresponding string of PV modules such that each dc-dc converter transferring power to the common dc-bus continues to operate within its optimal efficiency range to increase the energy yield of the PV power plant.

While the invention has been described in terms of various specific embodiments, those skilled in the art will recognize that the invention can be practiced with modification within the spirit and scope of the claims.

What is claimed is:

1. A string level maximum power point distributed photovoltaic (PV) power plant comprising:
   one or more dc-dc converters;
   at least one string of PV modules, wherein each dc-dc converter receives power from at least one corresponding string of PV modules, and further wherein at least one dc-dc converter is configured to transfer power to a common dc-bus based upon the total system power available from each of its corresponding strings of PV modules such that each dc-dc converter transferring power to the common dc-bus continues to operate within its optimal efficiency range to increase the energy yield of the PV power plant; and
   at least one combiner box, each combiner box comprising:
      at least one local control unit, wherein each local control unit is configured to control a single dc-dc converter selected from the one or more dc-dc converters based on commands received via an external communication bus; and
      a local data bus configured to provide communication between local control units, wherein each local control unit is configured to select and control operation of its corresponding dc-dc converter such that at least one dc-dc converter transfers power to a common dc-bus based upon the total system power available from each of its corresponding strings of PV modules, and further such that each dc-dc converter transferring power to the common dc-bus continues to operate within its optimal efficiency range to increase the energy yield of the PV power plant.

2. The power plant according to claim 1, wherein at least one dc-dc converter is configured together with a corresponding dc-ac converter to provide a two-stage central inverter.

3. The power plant according to claim 2, wherein each dc-dc converter that is configured together with a corresponding dc-ac converter to provide a two-stage central inverter, comprises an interleaved buck-boost string converter topology.

4. The power plant according to claim 1, wherein the one or more dc-dc converters and the at least one string of PV modules are configured together to provide a PV module string combiner distribution structure.

5. The power plant according to claim 1, wherein the one or more dc-dc converters and the at least one string of PV modules are configured together to provide a PV module string distribution structure.

6. The power plant according to claim 1, wherein each combiner box further comprises a central control unit configured to control operation of the local control units based on commands provided via the central control unit.

7. The power plant according to claim 1, wherein at least one dc-dc converter comprises an interleaved buck-boost string converter topology.

8. A method of operating a string level maximum power point distributed photovoltaic (PV) power plant, the method comprising:
   providing one or more dc-dc converters, each dc-dc converter receiving power from at least one string of corresponding PV modules;
   transferring power to a common dc-bus from at least one of the one or more dc-dc converters such that the power transferred from each dc-dc converter contributing power to the common dc-bus is based upon the total system power available from each of its corresponding strings of PV modules, and further such that each dc-dc converter transferring power to the common dc-bus continues to operate within its optimal efficiency range to increase the energy yield of the PV power plant;

providing at least one combiner box, each combiner box comprising: at least one local control unit; and a local data bus;

configuring each local control unit to control a single dc-dc converter based on commands received via an external communication bus; and configuring the local data bus to provide communication between local control units, such that each local control unit selects and controls operation of its corresponding dc-dc converter, and further such that at least one dc-dc converter transfers power to a common dc-bus based upon the total system power available from each of its corresponding strings of PV modules, and further such that each dc-dc converter transferring power to the common dc-bus continues to operate within its optimal efficiency range to increase the energy yield of the PV power plant.

9. The method according to claim 8, further comprising configuring at least one dc-dc converter together with a corresponding ac-dc converter to provide a two-stage central inverter.

10. The method according to claim 9, wherein configuring at least one dc-dc converter together with a corresponding dc-ac converter comprises configuring at least one interleaved buck-boost string converter together with a corresponding ac-dc converter to provide a two-stage central inverter.

11. The method according to claim 8, further comprising configuring the one or more dc-dc converters and the at least one string of PV modules together to provide a PV module string combiner distribution structure.

12. The method according to claim 8, further comprising configuring the one or more dc-dc converters and the at least one string of PV modules together to provide a PV module string distribution structure.

13. The method according to claim 8, further comprising providing a central control unit in each combiner box and configuring the central control unit to control operation of the local control units based on commands provided via the central control unit.

14. A string level maximum power point distributed photovoltaic (PV) power plant comprising a plurality of distributed dc-dc converters configured to switch in coordination with one another such that at least one dc-dc converter transfers power to a common dc-bus based upon the total system power available from one or more corresponding strings of PV modules, and further such that each dc-dc converter transferring power to the common dc-bus continues to operate within its optimal efficiency range to increase the energy yield of the PV power plant, wherein the plurality of distributed dc-dc converters are configured to coordinate a global maximum power point search such that dc-dc converters participating in the search do not interfere with one another to cause intermittent power reductions in the PV plant output power.

15. The PV power plant according to claim 14, wherein at least one dc-dc converter is configured together with a corresponding ac-dc converter to provide a two-stage central inverter.

16. The PV power plant according to claim 15, wherein each dc-dc converter that is configured together with a corresponding dc-ac converter to provide a two-stage central inverter, comprises an interleaved buck-boost string converter topology.

17. The PV power plant according to claim 14, wherein at least one dc-dc converter and a plurality of PV modules are configured together to provide a PV module string combiner distribution structure.

18. The PV power plant according to claim 17, wherein the plurality of dc-dc converters and the plurality of PV modules are configured such that the dc-dc converters are connected directly at corresponding module strings to provide coordinated switching through a dc-dc converter controller communication network or through a central controller in electrical communication with the dc-dc converter controller communication network.

19. The PV power plant according to claim 14, wherein at least one dc-dc converter and a plurality of PV modules are configured together to provide a PV module string distribution structure.

20. The PV power plant according to claim 19, wherein the plurality of dc-dc converters and the plurality of PV modules are configured such that the dc-dc converters are connected directly at corresponding module strings to provide coordinated switching through a dc-dc converter controller communication network or through a central controller in electrical communication with the dc-dc converter controller communication network.

21. The PV power plant according to claim 14, wherein at least one dc-dc converter comprises at least one type of device selected from silicon devices and wide band gap devices.

22. The PV power plant according to claim 21, wherein the devices are selected from silicon carbide (SiC) devices and gallium nitride (GaN) devices.

23. A string level maximum power point distributed photovoltaic (PV) power plant comprising:

a plurality of distributed dc-dc converters configured to switch in coordination with one another such that at least one dc-dc converter transfers power to a common dc-bus based upon the total system power available from one or more corresponding strings of PV modules, and further such that each dc-dc converter transferring power to the common dc-bus continues to operate within its optimal efficiency range to increase the energy yield of the PV power plant;

a plurality of mechanical or semiconductor switches; and a plurality of local controllers or a central control unit, wherein the plurality of mechanical or semiconductor switches are configured to control power flow between the dc-dc converters in response to signals received from the plurality of local controllers or central control unit.

* * * * *